(12) United States Patent
Sevindik et al.

(10) Patent No.: US 11,252,607 B2
(45) Date of Patent: Feb. 15, 2022

(54) COMMUNICATION SYSTEM MANAGEMENT AND PERFORMANCE REPORTING

(71) Applicant: Charter Communications Operating, LLC, St. Louis, MO (US)

(72) Inventors: Volkan Sevindik, Reston, VA (US); Haider H. Syed, Parker, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 8 days.

(21) Appl. No.: 16/852,796

(22) Filed: Apr. 20, 2020

(65) Prior Publication Data

US 2021/0329497 A1    Oct. 21, 2021

(51) Int. Cl.
| | | |
|---|---|---|
| H04W 28/08 | (2009.01) | |
| H04W 88/16 | (2009.01) | |
| H04W 24/08 | (2009.01) | |
| H04W 16/14 | (2009.01) | |
| H04W 88/08 | (2009.01) | |

(52) U.S. Cl.
CPC ....... *H04W 28/0983* (2020.05); *H04W 16/14* (2013.01); *H04W 24/08* (2013.01); *H04W 88/085* (2013.01); *H04W 88/16* (2013.01)

(58) Field of Classification Search
CPC .................................................. H04W 28/0983
See application file for complete search history.

(56) References Cited

U.S. PATENT DOCUMENTS

| | | | |
|---|---|---|---|
| 7,113,484 B1 * | 9/2006 | Chapman ............ | H04L 12/2801 370/252 |
| 2016/0066199 A1 * | 3/2016 | Yeddala ............ | H04W 28/0289 370/230 |
| 2017/0264449 A1 * | 9/2017 | Seetharaman ........ | H04L 47/801 |
| 2021/0185541 A1 * | 6/2021 | Potharaju .............. | H04W 48/16 |

* cited by examiner

*Primary Examiner* — Kodzovi Acolatse
*Assistant Examiner* — Abdeltif Ajid
(74) *Attorney, Agent, or Firm* — Armis IP Law, LLC

(57) ABSTRACT

A gateway communication resource provides access to a remote network over a communication link. For example, a communication management resource (such as in a subscriber domain) receives log information associated with the gateway communication resource. The log information indicates an operational status of the gateway communication resource. The communication management resource also receives performance threshold information in which to analyze performance of the communication resource. Via application of the performance threshold information to the log information, the communication management resource generates a performance report indicative of a performance status of the gateway communication resource communicating over the communication link.

35 Claims, 10 Drawing Sheets

REPORT
R1 195
FROM LOG L1 ┌─────────┐
┌─────────┐ THRESHOLD  STATUS
PARAMETER

CPU LOAD = 58%                              80%      PASS
BUFFER LOAD = 89%                           95%      PASS
OPERATING PWR = 60% OF MAX                  90%      PASS
UPLINK QUALITY OF SERVICE = 8                5       PASS
DOWNLINK QUALITY OF SERVICE = 6              5       PASS
AVERAGE BANDWIDTH = 105 MB/S              95 MB/S    PASS
ROUND TRIP PACKET TIME = 2 MILLISENDS       5 MS     PASS
•••                                         •••      •••

FIG. 3

REPORT
R2-C
195

| FROM LOG L2 PARAMETER | THRESHOLD | STATUS |
|---|---|---|
| CPU LOAD = 95% | 80% | FAIL |
| BUFFER LOAD = 89% | 95% | PASS |
| OPERATING PWR = 87% OF MAX | 90% | PASS |
| UPLINK QUALITY OF SERVICE = 8 | 5 | PASS |
| DOWNLINK QUALITY OF SERVICE = 3 | 5 | FAIL |
| AVERAGE BANDWIDTH = 76 | 95 | FAIL |
| ROUND TRIP PACKET TIME = 100 MS | 5 MS | FAIL |
| ... | ... | ... |

FIG. 7

COMMUNICATION SYSTEM MANAGEMENT AND PERFORMANCE REPORTING

BACKGROUND

A conventional cable modem supports connectivity between a cable subscriber domain and a respective cable modem termination system. In general, a cable modem is a hardware/software device that allows a computer in the subscriber domain to communicate with an Internet service provider over a physical communication link such as a landline connection.

Typically, a cable modem termination system resides in a head-end and supports communications with many cable modems over respective communication links. In such an instance, the cable modem termination system provides many subscribers in respective subscriber domains connectivity to the Internet.

Conventional wireless networks typically include one or more wireless stations to provide mobile communication devices access to a remote network such as the Internet. One type of wireless station is a so-called CBSD (Citizen Broadband Radio Service Device).

In an example CBRS (Citizens Band Radio Service) network, each CBSD (Citizen Broadband Radio Service Device) is assigned a certain amount of wireless spectrum from an entity such as a Spectrum Access Service (SAS).

BRIEF DESCRIPTION OF EMBODIMENTS

Embodiments herein provide novel ways of providing improved wireless communications to one or more mobile communication devices in a network environment.

For example, one embodiment herein includes a gateway communication resource (such as in a subscriber domain) that provides access to a remote network over a communication link. A communication management resource in the subscriber domain receives log information associated with the gateway communication resource. The log information indicates an operational status of the gateway communication resource. The communication management resource also receives performance threshold information in which to analyze performance of the communication resource.

Via application of the performance threshold information to the log information (such as including analyzing the log information using one or more performance threshold values), the communication management resource generates a performance report indicative of a performance status of the gateway communication resource communicating over the communication link. Thus, in one embodiment, the communication management resource analyzes the received log information based on the performance threshold information, which specifies one or more thresholds (metrics). Using the performance threshold information, the communication management resource determines whether the gateway communication resource operates above an acceptable threshold value for each monitored parameter as specified by the log information.

In accordance with further example embodiments, the gateway communication resource communicates the performance report through the gateway communication resource to a remote communication device. In one embodiment, the gateway communication resource is one of multiple gateway communication resources monitored by the remote communication device (such as a cable modem termination system or other suitable resource).

The performance threshold information received by the communication management resource specifies any suitable information such as one or more performance threshold values to be applied to received log information. The communication management resource generates the performance report based on the performance threshold value applied to respective log information. In one embodiment, the gateway communication resource communicates the performance report in response to detecting that the performance status of the gateway communication resource falls below the performance threshold value. In such an instance, the report indicates a failure such as that the performance status of the gateway communication resource falls below the performance threshold value.

Note that the remote communication device can be any suitable type of device. In one embodiment, the remote communication device monitoring multiple gateway communication resources is a cable modem termination system.

In still further example embodiments, the gateway communication resource in the subscriber domain is a cable modem that provides a wireless base station connectivity through the communication link and a cable modem termination system to a remote network. The communication link (to which the analyzed log information pertains) extends between the gateway communication resource and the cable modem termination system.

Further embodiments herein include, via the gateway communication resource in the subscriber domain, monitoring conveyance of communications over the communication link between the gateway communication resource and the remote network; and in response to detecting that the amount of communications over the communication link is below a threshold value, communicating the performance report through the gateway communication resource over the communication link to a communication management resource in the remote network.

In yet further example embodiments, the gateway communication resource in the subscriber domain is a cable modem; the communication management resource in the remote network is a cable modem termination system.

Still further embodiments herein include, via the communication management resource in the subscriber domain, receiving the log information from the gateway communication resource; applying the performance threshold information to the log information; and in response to detecting that the performance status of the gateway communication resource is above a performance threshold value, notifying the gateway communication resource to delete the log information.

Note that embodiments herein are applicable to any suitable type of communication system. The communication link can be configured to support communications in accordance with any suitable type of communication protocol. In one embodiment, the communication link supports conveyance of communications in accordance with the DOCSIS (Data Over Cable Service Interface Specification) communication protocol.

In still further example embodiments, the gateway communication resource (supporting analysis of the log information) provides network connectivity between a CBRS (Citizens Band Radio Service) wireless station (a.k.a., a CBSD) and the remote network. For example, in one embodiment, a wireless station provides wireless connectivity to multiple mobile communication devices. A communication management resource associated with the wireless station applies the performance threshold information to the received log information as a background task with respect to providing the wireless connectivity to the multiple mobile communication devices. Conveyance of the log information to the communication management resource alleviates the gateway communication resource from having to analyze the respective data and issue any failure alerts. That is, as previously discussed, the communication management resource communicates any detected failures associated with the gateway communication resource to the remote management resource.

Note that any of the resources as discussed herein can include one or more computerized devices, communication management resources, mobile communication devices, servers, base stations, wireless communication equipment, communication management systems, controllers, workstations, user equipment, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (such as any computer readable hardware storage medium, computer readable storage hardware, etc.) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage hardware medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed on a computerized device to cause the computerized device to perform the techniques explained herein.

Accordingly, embodiments herein are directed to a method, system, computer program product, etc., that supports operations as discussed herein.

One embodiment includes a computer readable storage medium and/or system having instructions stored thereon to facilitate wireless communications and enhanced monitoring and reporting in a network environment. The instructions, when executed by computer processor hardware, cause the computer processor hardware (such as one or more co-located or disparately processor devices or hardware) to: receive log information associated with a gateway communication resource that provides access to a remote network over a communication link, the log information indicating an operational status of the gateway communication resource; receive performance threshold information in which to analyze performance of the communication resource; and via application of the performance information to the log information, generate a performance report indicative of a performance status of the gateway communication resource communicating over the communication link.

Note that the ordering of the steps above has been added for clarity sake. Further note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of providing communication services. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section (which is a summary of embodiments) and corresponding figures of the present disclosure as further discussed below.

BRIEF DESCRIPTION OF THE DRAWINGS

FIG. 3 is an example diagram illustrating generation of a performance report according to embodiments herein.

FIG. 7 is an example diagram illustrating a performance report according to embodiments herein.

Figure 1:
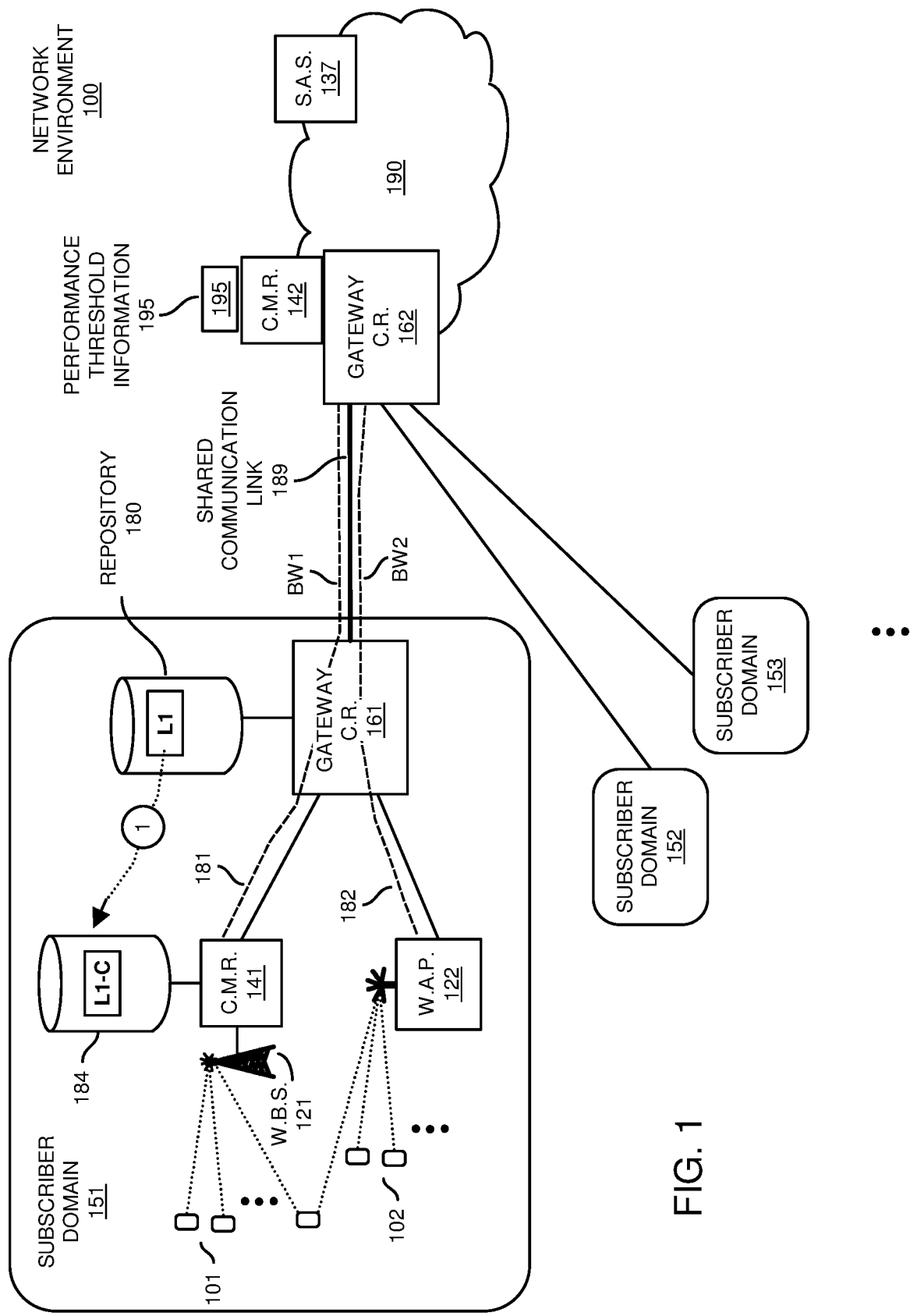
FIG. 1 is an example diagram illustrating a communication network environment and distribution of log information according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

In accordance with general embodiments, a gateway communication resource such as cable modem provides a subscriber domain and corresponding communication devices access to a remote network over a communication link. For example, by way of non-limiting example embodiment, the gateway communication resource supports connectivity of a wireless access point and a wireless base station, each of which supports wireless access in the subscriber domain. The gateway communication resource physically connects the wireless access point and the wireless base station to a remote network through a remote gateway communication resource. Such a shared communication link is prone to congestion when supporting both the wireless base station and the wireless access point for each of multiple subscriber domains.

In one embodiment, the communication management resource associated with the wireless base station receives log information associated with the gateway communication resource and/or communication link through which the communication management resource communicates to a remote network. The log information indicates an operational status of the gateway communication resource and/or communication link. The communication management resource also receives performance threshold information in which to analyze performance of the gateway communication resource. Via application of the performance threshold information to the log information, the communication management resource generates a performance report indicative of a performance status of the gateway communication resource communicating over the shared communication link.

In one embodiment, the communication management resource communicates the performance report to a remote communication management resource overseeing multiple subscriber domains.

Now, more specifically, with reference to the drawings, FIG. 1 is an example diagram illustrating a wireless network environment and user equipment tracking according to embodiments herein.

As shown, network environment 100 includes multiple subscriber domains 151, 152, 153, etc. In this example embodiment, the subscriber domain 151 includes a gateway communication resource 161, communication management resource 141, wireless access point 122, and wireless base station 121.

Note that each of the subscriber domains 152, 153, etc., is configured in a similar manner as subscriber domain 151.

Each of the resources in network environment 100 can be configured to include or be configured as appropriate hardware, software, or combination of hardware and software to carry out respective operations as discussed herein.

More specifically, the communication management resource 141 as described herein can be implemented via respective communication management hardware, communication management software, or a combination of both.

Gateway communication resource 161 as described herein can be implemented via respective gateway communication hardware, gateway communication software, or a combination of both.

The gateway communication resource 162 as described herein can be implemented via respective gateway communication hardware, gateway communication software, or a combination of both.

Communication management resource 142 as described herein can be implemented via respective communication management hardware, communication management software, or a combination of both; and so on.

Further in this example embodiment, the wireless base station 121 supports wireless connectivity to mobile communication devices 101 (a.k.a., user equipment) and/or mobile communication devices 102.

More specifically, in an upstream direction, each of the mobile communication devices 101 and/or 102 communicates over a respective wireless communication link to the wireless base station 121. As further shown, the bandwidth BW1 in the shared communication link 189 supports the upstream and downstream communications associated with the wireless base station 121 and corresponding communication devices.

In one embodiment, a combination of bandwidth BW1 and bandwidth BW2 is a fixed amount of bandwidth allocated to support communications associated with the subscriber domain 151. Preference of bandwidth may be given to bandwidth BW1 so that the wireless base station 121 is able to support high quality communications between the mobile communication devices 101 over the communication path 181 to the remote network 190.

In accordance with further example embodiments, the wireless base station 121 and corresponding communication management resource 141 forwards the communications associated with the mobile communication devices in an upstream direction over communication path 181 to one or more target devices in the remote network 190. As shown, the communication path 181 passes through the combination of the gateway communication resource 161, shared communication link 189, and gateway communication resource 162 to the remote network 190.

In a downstream direction, one or more devices in the network 190 communicate through the gateway communication resource 161 over the communication path 181 to the wireless base station 121 and corresponding communication management resource 141. The wireless base station 121 and/or corresponding communication management resource 141 wirelessly forward the corresponding downstream communications to the appropriate mobile communication devices.

Further in this example embodiment, the bandwidth BW2 in the shared communication link 189 supports the upstream and downstream communications associated with the wireless access point 122 (such as supporting WiFi™ or other suitable wireless communication protocol) and corresponding communication devices.

For example, the wireless access point 122 forwards received communications in an upstream direction over communication path 182 to the remote network 190 and corresponding target devices. As further shown, the communication path 182 passes through the combination of the gateway communication resource 161, shared communication link 189, and gateway communication resource 162 to the remote network 190.

In a downstream direction, devices in the network 190 communicate over the communication path 182 to the wireless access point 122. The wireless access point 122 forwards the corresponding downstream communications to the appropriate mobile communication devices.

In one nonlimiting example embodiment, the gateway communication resource 161 is a cable modem; the gateway communication resource 162 is a cable modem termination system.

Thus, the gateway communication resource 161 can be a cable modem that provides a wireless base station 121 connectivity through the shared communication link 189 and a cable modem termination system (such as communication management resource 162) to a remote network 190. The shared communication link 189 and communication management resource 141 (to which the log information pertains) extends between the gateway communication resource 161 and the gateway communication resource 162.

In such an instance, in an upstream direction, the gateway communication resource 161 encapsulates each received message (data packet) from wireless base station 121 and wireless access point 122 and forwards the encapsulated message over the shared communication link 189 (such as in accordance with Data Over Cable Service Interface Specification or other suitable communication protocol) to the gateway communication resource 162. The gateway communication resource 162 removes the encapsulation routing information from the received packets and forwards the original messages from the mobile communication devices and wireless stations (such as wireless base station 121 and wireless access point 122) to an appropriate target in network 190.

In the downstream direction, the gateway communication resource 1621 encapsulates each received message from the network 190 and forwards the encapsulated message over the shared communication link 189 (such as in accordance with Data Over Cable Service Interface Specification or other suitable communication protocol) to the gateway communication resource 161. The gateway communication resource 161 removes the encapsulation routing information and forwards the original messages through the wireless base station 121 and wireless access point 122 to the appropriate communication device in the subscriber domain 151.

Embodiments herein are applicable to any suitable type of communication system. The shared communication link 189 can be configured to support communications in accordance with any suitable type of communication protocol.

In one embodiment, the wireless base station 121 (such as a CBSD or Citizens Broadband Radio Service Device) supports wireless communications with the communication devices 101 and/or 102 via a CBRS (Citizens Band Radio Service) wireless communication protocol. In such an instance, the wireless base station 121 and communication management resource 141 communicate with the spectrum access system 137 for allocation of wireless channels to communicate in the network environment 100.

In one embodiment, the one or more wireless channels allocated to the wireless base station 121 can be revoked (de-allocated from the wireless base station 121) in response to the spectrum access system 137 detecting a condition such as that an incumbent user having a higher priority than the wireless base station 121 needs to use such wireless channels. Revocation can include communicating a revocation message from the spectrum access system 137 to the communication management resource 141 and wireless base station 181.

Thus, in one embodiment, the wireless base station 121 and communication management resource 141 provide wireless connectivity (such as via CBRS or other suitable wireless communication protocol) to multiple mobile communication devices 101. In one embodiment, the wireless base station supports a private 5G wireless network to subscriber domain 151.

In yet further example embodiments, the gateway communication resource 161 produces log information L1 (for a first duration of time) including monitor or status information associated with communications through the gateway communication resource 161 and/or shared communication link 189. The log information indicates a health operational status of the gateway communication resource 161.

Note that the status information captured in the log information L1 includes any suitable information.

In one embodiment, the log information L1 include status information for monitored parameters such as processing unit load usage associated with the gateway communication resource 161, buffer load usage associated with the gateway communication resource 161, power consumed by the gateway communication resource 161 and related circuitry, upstream link quality service associated with the gateway communication resource 161 and shared communication link 189, downstream link quality service associated with the gateway communication resource 161 and shared communication link 189, average upstream and average downstream bandwidth (such as bandwidth BW1 associated with the wireless base station 121 and bandwidth BW2 associated with the wireless access point 122) associated with the gateway communication resource 161 and shared communication link 189, round-trip packet transmission time of communicating test or other communications over the shared communication link 189 such as between the gateway communication resource 161 and gateway communication resource 162 or other suitable entity, and so on.

As further shown, via operation #1, the communication management resource 141 (such as in subscriber domain 151) associated with the wireless base station 121 receives the log information L1 associated with the gateway communication resource 161 and the shared communication link 189. Communication management resource 141 or other suitable resource stores the copy of the log information L1 (as L1-C) in repository 184 for analysis. As previously discussed, the log information L1 indicates an operational status of the gateway communication resource 161 and corresponding shared communication link 189 such as during a first time range.

Figure 2:
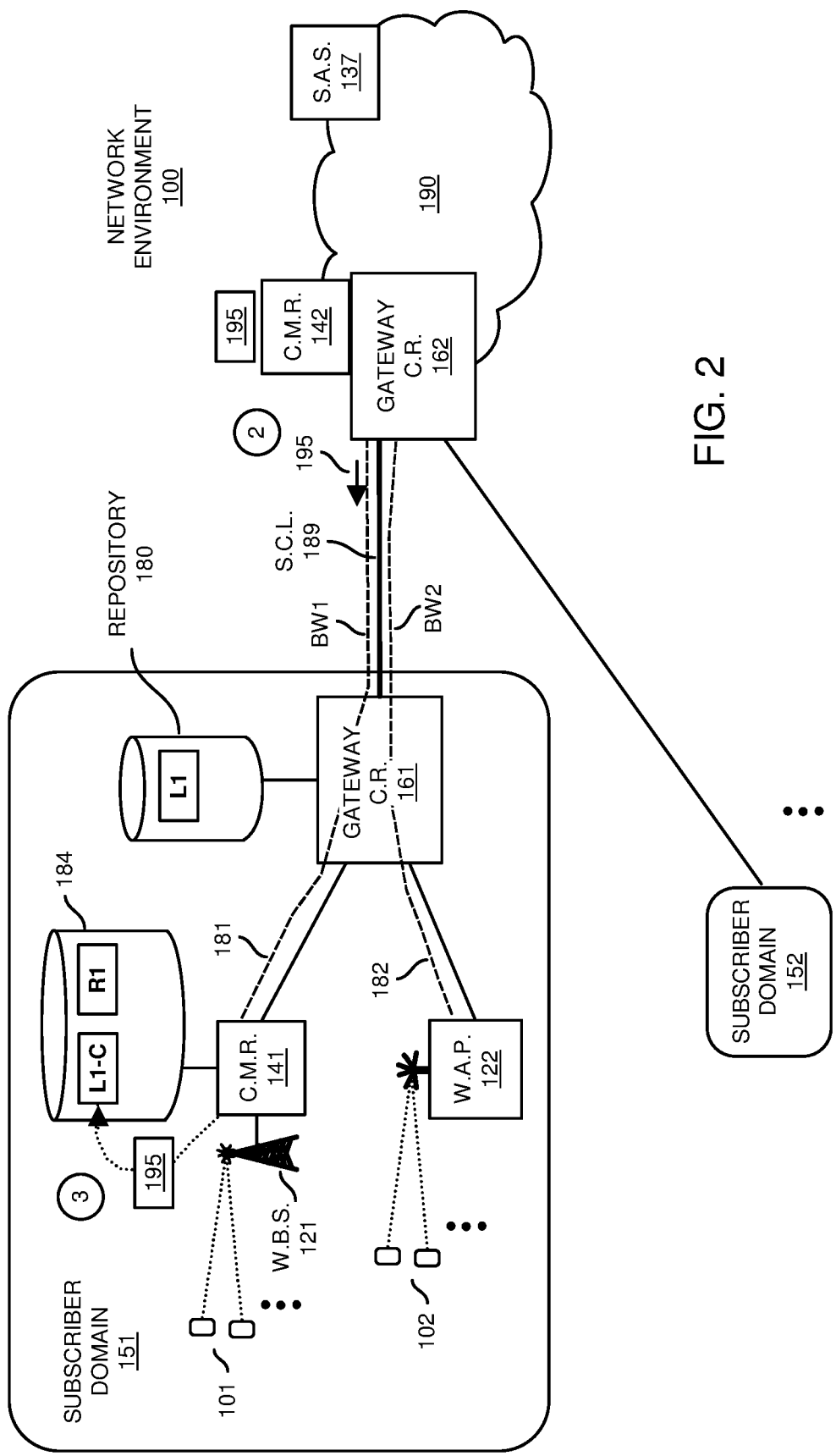
FIG. 2 is an example diagram illustrating application of performance threshold metrics to received log information according to embodiments herein.

Additional details of analyzing the log information L1-C (copy of log information L1 stored in repository 180) is shown in FIG. 2.

FIG. 2 is an example diagram illustrating application of performance metrics to received log information according to embodiments herein.

In addition to receiving the log information L1, via operation #2, the communication management resource 141 also receives performance threshold information 195 in which to analyze performance of the gateway communication resource 161 and shared communication link 189.

For example, via application of the performance threshold information 195 to the log information L1 in operation #3, the communication management resource 141 generates a performance report R1 that is stored in repository 184.

In this example embodiment, the report R1 indicates a performance status of the gateway communication resource 161 and/or shared communication link 189 based on log information L1.

In one embodiment, the performance threshold information 195 indicates a threshold value for each parameter monitored by the communication management resource 141.

More specifically, in one embodiment, the performance threshold information 195 indicates a maximum threshold value of 80% for CPU load; the performance threshold information 195 indicates a maximum threshold value of 95% for buffer load; the performance threshold information 195 indicates a maximum operating power threshold value of 90%; the performance threshold information 195 indicates a minimum uplink quality threshold value of 5; the performance threshold information 195 indicates a minimum downlink quality of service threshold value of 5; the performance threshold information 195 indicates an average bandwidth of 95 MB/second; the program information indicates a maximum round-trip time threshold value of 10 milliseconds; and so on.

Note further that the wireless base station 121 and corresponding communication management resource 141 can be configured to receive the performance threshold information 195 from the communication management resource 142 or other suitable resource.

As previously discussed, the communication management resource 141 applies the received performance threshold information 195 (such as threshold value information, evaluation information, etc.) to the received log information L1 as a background task to providing the wireless connectivity to the multiple mobile communication devices. In such an instance, the communication devices 101 are assured of high link quality such as high bandwidth and low latency communications.

The shared communication link 189 is prone to congestion when supporting both the wireless base station 121 and the wireless access point 122 as well as communication devices in other subscriber domains. Embodiments herein include monitoring the log information L1 to ensure that the communication management resource 141 and corresponding wireless base station 181 are able to provide sufficient link quality to the communication devices 101 and/or 102 via communications over the communication path 181.

In one embodiment, the gateway communication resource is configured to provide higher priority to communicating the data packets received from the communication management resource 141 over the shared communication link 189 and lower priority to communicating the data packets received from the wireless access point 122 over the shared communication link 189.

In one embodiment, the communication management resource 141 is a base-band unit (BBU) connected to the gateway communication resource 161 (such as a cable modem). Bandwidth capacity of the shared communication link 189 is mainly consumed by subscribers who consume real-time data. The additional bandwidth BW1 consumed by the wireless base station 121 and the communication devices potentially degrades link quality. Embodiments herein includes implementing resources in a BBU to analyze the log information, and utilize resources of link (link 181) between the communication management resource 141 (BBU) and the gateway communication resource 161 to transfer the log information L1 at idle moments when the traffic on the link 181 (such as between the communication management resource 141 and gateway communication resource 161 or between the gateway communication resource 161 and the gateway communication resource 162) is below a predefined threshold value.

FIG. 3 is an example diagram illustrating generation of a performance report according to embodiments herein.

As shown, via operation #3, the communication management resource 141 applies the received performance threshold information 195 to the log information L1 to produce corresponding report R1. In this example embodiment, the communication management resource 141 applies the performance threshold information 195 to the log information L1 to produce PASS status information for each monitored attribute.

Figure 4:
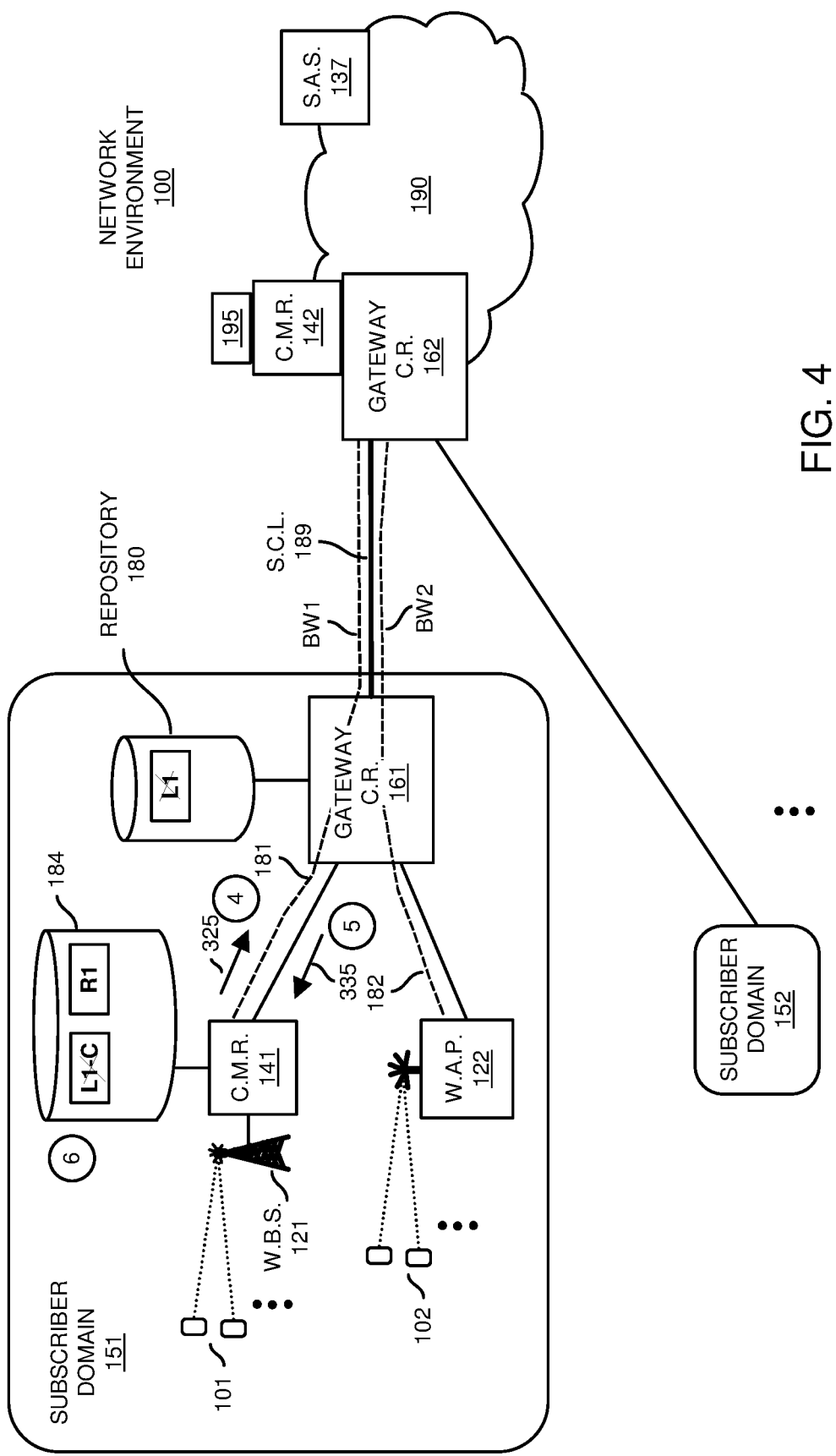
FIG. 4 is an example diagram illustrating deletion of log information according to embodiments herein.

More specifically, in response to detecting that the CPU load of 58 percent is less than the threshold value of 80 percent, the communication management resource 141 generates the status information in report R1 to indicate a PASS status for the first parameter; in response to detecting that the buffer load of 89 percent is less than the threshold value of 95 percent, the communication management resource 141 generates the corresponding status information in report R1 to indicate a PASS status for the second parameter; in response to detecting that the operating power of the gateway communication resource 161 is less than the threshold value of 90 percent, the communication management resource 141 generates the status information in report R1 to indicate a PASS status for the third parameter; in response to detecting that the uplink quality of service associated with the communication path 181 is greater than the threshold value of 5, the communication management resource 141 generates the status information in report R1 to indicate a PASS status for the fourth parameter; in response to detecting that the downlink quality of service associated with the communication path 181 is greater than the threshold value of 5, the communication management resource 141 generates the status information in report R1 to indicate a PASS status for the fifth parameter; in response to detecting that the average bandwidth 105 MB/S associated with the communication path 181 is greater than the threshold value of 95, the communication management resource 141 generates the status information in report R1 to indicate a PASS status for the sixth parameter; in response to detecting that the round-trip time of 2 milliseconds associated with communicating packets between gateway communication resource 161 and gateway communication resource 162 is less than the threshold value of 5 milliseconds, the communication management resource 141 generates the status information in report R1 to indicate a PASS status for the seventh parameter; and so on. FIG. 4 is an example diagram illustrating deletion of log information according to embodiments herein.

In response to detecting that there are no failures (each monitored attribute receives a PASS status) associated with the gateway communication resource 161 via analysis of the log information L1, via operation #4, the communication management resource 141 notifies (via communications 325) the gateway communication resource 161 to delete the login information L1 stored in the repository 180 via communications 325.

Thus, embodiments herein include, via the communication management resource 141: receiving the log information L1 from the gateway communication resource 161; applying the performance threshold information 195 to the log information L1; and in response to detecting that the performance status of the gateway communication resource 141 is above each of multiple performance threshold values for the monitored attributes, the communication management resource 141 notifies the gateway communication resource 161 to delete the no longer needed log information L1 stored in repository 180.

Via operation #5 and corresponding communications 335, the gateway communication resource 161 confirms deletion of the log information L1 stored in repository 180. In response to receiving the notification of deletion as indicated by the communications 335, the communication management resource 141 deletes the copy of log information L1-C stored in repository 184. If desired, the report R1 in repository 180 can be deleted as well.

Figure 5:
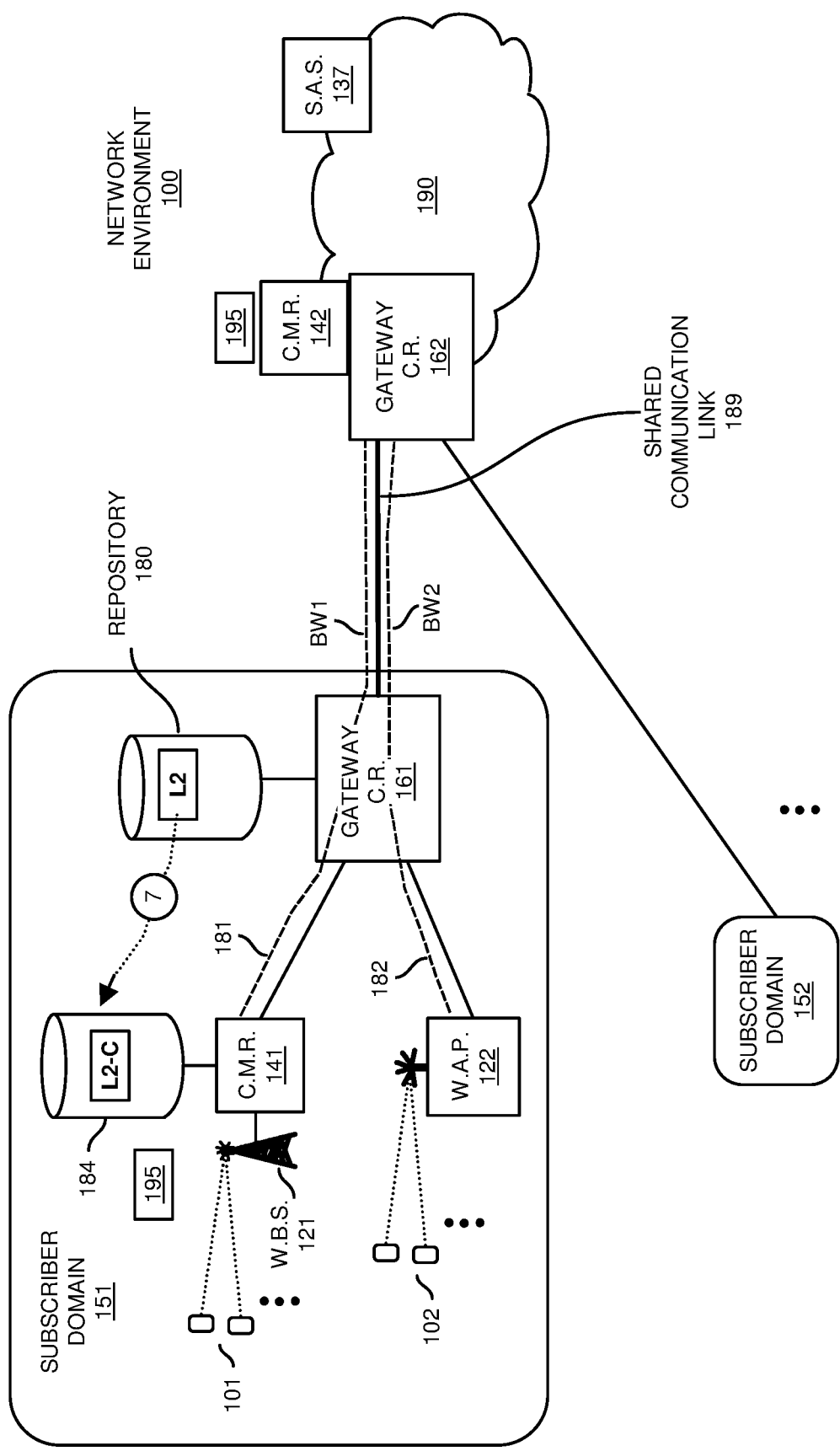
FIG. 5 is an example diagram illustrating a communication network environment and distribution of log information from a gateway communication resource to a communication management resource according to embodiments herein.

FIG. 5 is an example diagram illustrating a communication network environment and distribution of log information according to embodiments herein.

In yet further example embodiments, in a similar manner as previously discussed, the gateway communication resource 161 produces log information L2 (such as for a second duration of time) including monitor information associated with the gateway communication resource 161 and/or shared communication link 189 such as processing unit load usage associated with the gateway communication resource 161, buffer load usage associated with the gateway communication resource 161, operating power consumed by the gateway communication resource 161 and related circuitry, upstream link quality service associated with the gateway communication resource 161 and shared communication link 189, downstream link quality service associated with the gateway communication resource 161 and shared communication link 189, average upstream and average downstream bandwidth associated with the gateway communication resource 161 and shared communication link 189, round-trip packet transmission time of communicating test or other communications over the shared communication link 189 such as between the gateway communication resource 161 and gateway communication resource 162, and so on.

As further shown, via operation #7, the communication management resource 141 (such as in subscriber domain 151) associated with the wireless base station 121 receives log information L2 associated with the gateway communication resource 161 and the shared communication link 189.

Communication management resource 141 or other suitable resource stores the copy (L2-C) of the log information L1 in repository 184. As previously discussed, the log information L2 indicates an operational status of the gateway communication resource 161 and corresponding shared communication link 189 during a second time range.

Figure 6:
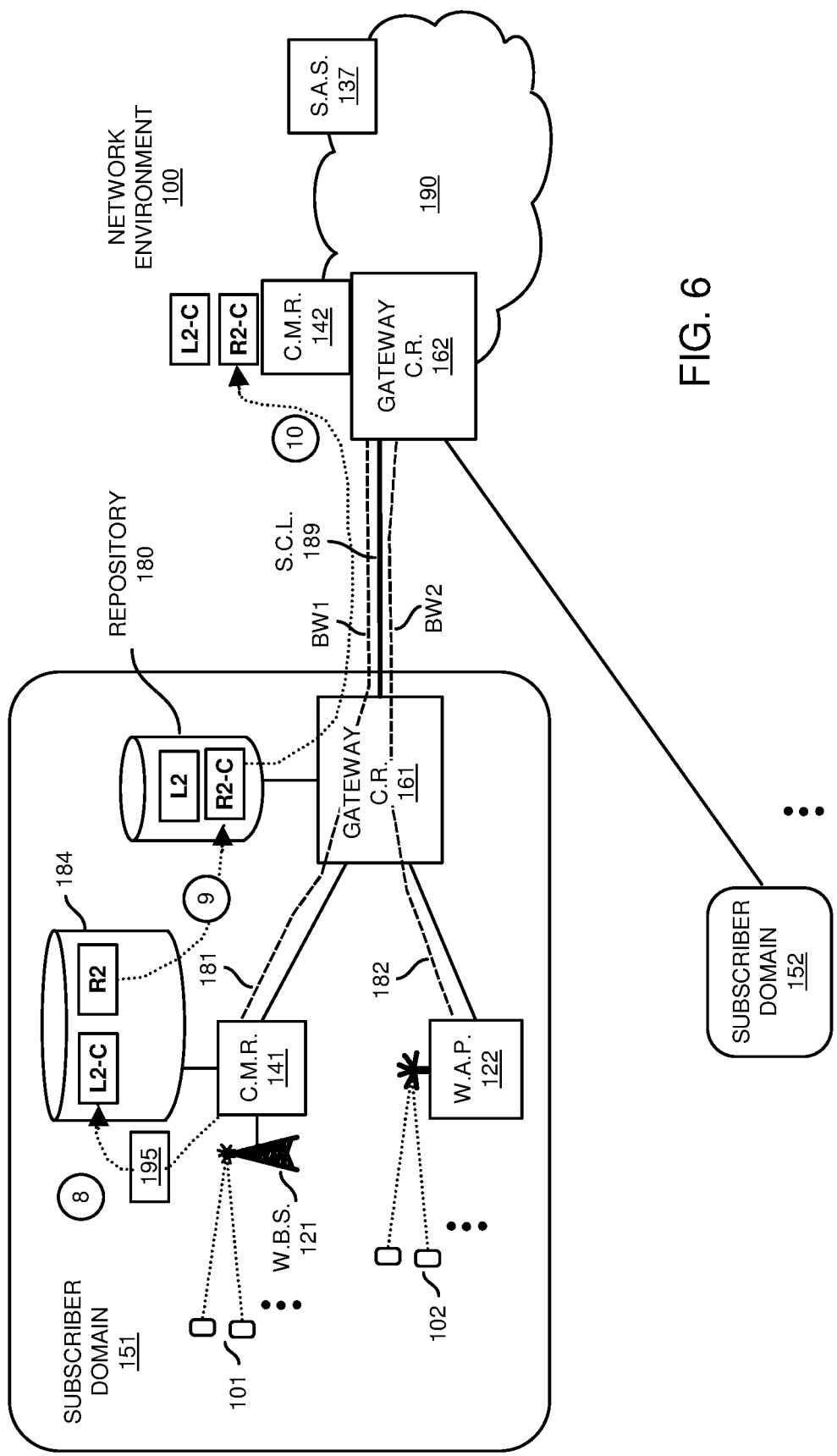
FIG. 6 is an example diagram illustrating application of performance metrics to received log information and generation of a respective performance report according to embodiments herein.

Additional details of analyzing the log information L2-C (copy of log information L2 stored in repository 180) is shown in FIG. 6.

FIG. 6 is an example diagram illustrating application of performance metrics to received log information according to embodiments herein.

In a similar manner as previously discussed, in operation #8, the communication management resource 141 applies the performance threshold information 195 to the received log information L2 stored repository 184 as log information L2-C.

As previously discussed, the performance threshold information 195 specifies multiple performance threshold values in which to analyze the log information. The gateway communication resource 141 produces the report R2 (associated with log information L2) to indicate which parameters fail or experience poor performance.

By further way of non-limiting example embodiment, in response to detecting one or more failures associated with the log information L2, the communication management resource 141 generates one or more alert notifications to the communication management resource 142 associated with the gateway communication resource 162. For example, in one embodiment, in response to detecting that the performance status of the gateway communication resource 161 and/or a bandwidth portion (such as BW1 plus BW2) of shared communication link 189 falls below one or more performance threshold values indicating a failure or poor performance, the communication management resource 141 produces the report R2 to indicate such performance failures/poor performance.

An example of the report R2 and corresponding status information for different monitored attributes is shown in FIG. 7.

FIG. 7 is an example diagram illustrating generation of a performance report according to embodiments herein.

As shown, via operation #8, the communication management resource 141 applies the received performance threshold information 195 to the log information L2 to produce corresponding report R2. In this example embodiment, the communication management resource 141 applies the performance threshold information 195 to the log information L2 to produce PASS as well as FAIL status information in the report R2.

More specifically, in response to detecting that the CPU load of 95 percent is above the threshold value of 80 percent, the communication management resource 141 generates the status information in report R2 to indicate a FAIL status for the first parameter; in response to detecting that the buffer load of 89 percent is less than the threshold value of 95 percent, the communication management resource 141 generates the corresponding status information in report R2 to indicate a PASS status for the second parameter; in response to detecting that the operating power (87%) of the gateway communication resource 161 is less than the threshold value of 90 percent, the communication management resource 141 generates the status information in report R2 to indicate a PASS status for the third parameter; in response to detecting that the uplink quality of service (8) associated with the communication path 181 is greater than the threshold value of 5, the communication management resource 141 generates the status information in report R2 to indicate a PASS status for the fourth parameter; in response to detecting that the downlink quality of service (value of 3) associated with the communication path 181 is less than the threshold value of 5, the communication management resource 141 generates the status information in report R2 to indicate a FAIL status for the fifth parameter; in response to detecting that the average bandwidth (76 MB/S) associated with the communication path 181 is less than the threshold value of 95 MB/S, the communication management resource 141 generates the status information in report R2 to indicate a FAIL status for the sixth parameter; in response to detecting that the round-trip time (such as a value of 100 milliseconds) associated with communicating test data packets between gateway communication resource 161 and gateway communication resource 162 (or other suitable entity) is greater than the threshold value of 5 milliseconds, the communication management resource 141 generates the status information in report R2 to indicate a FAIL status for the seventh parameter; and so on.

In a similar manner that the communication management resource 141 or other suitable entity in subscriber domain 151 determines a health status (based on detected performance) of the wireless base station 121, wireless access point 122, etc., each of the other subscriber domains in network environment 100 includes similar monitoring resources. Each of the subscriber domains 152, 153, etc., generates similar reports and notifies the communication management resource 142 (associated with gateway communication resource 162) of their status.

Note again that the gateway communication resource 162 can be any suitable type of device, system, etc. In one embodiment, the gateway communication resource 162 is a cable modem termination system. In such an instance, the cable modem termination system and corresponding communication management resource 142 receives status information (and failure notifications) from each of the different subscriber domains and provides corrective action such as dispatching a technician to fix any issues.

Referring again to FIG. 6, in response to detecting one or more failures associated with the gateway communication resource 161 and/or shared communication link 189, shared communication link 189, etc., the communication management resource 141 communicates the report R2 to the gateway communication resource 161 for storage in repository 180 in operation #9.

In operation #10, the gateway communication resource 161 or other suitable entity (such as communication management resource 141) communicates the report R2 (or corresponding report copy R2-C) to the communication management resource 142. In such an instance, the communication management resource 142 is notified of any corresponding failure or performance issues associated with the gateway communication resource 161.

Figure 8:
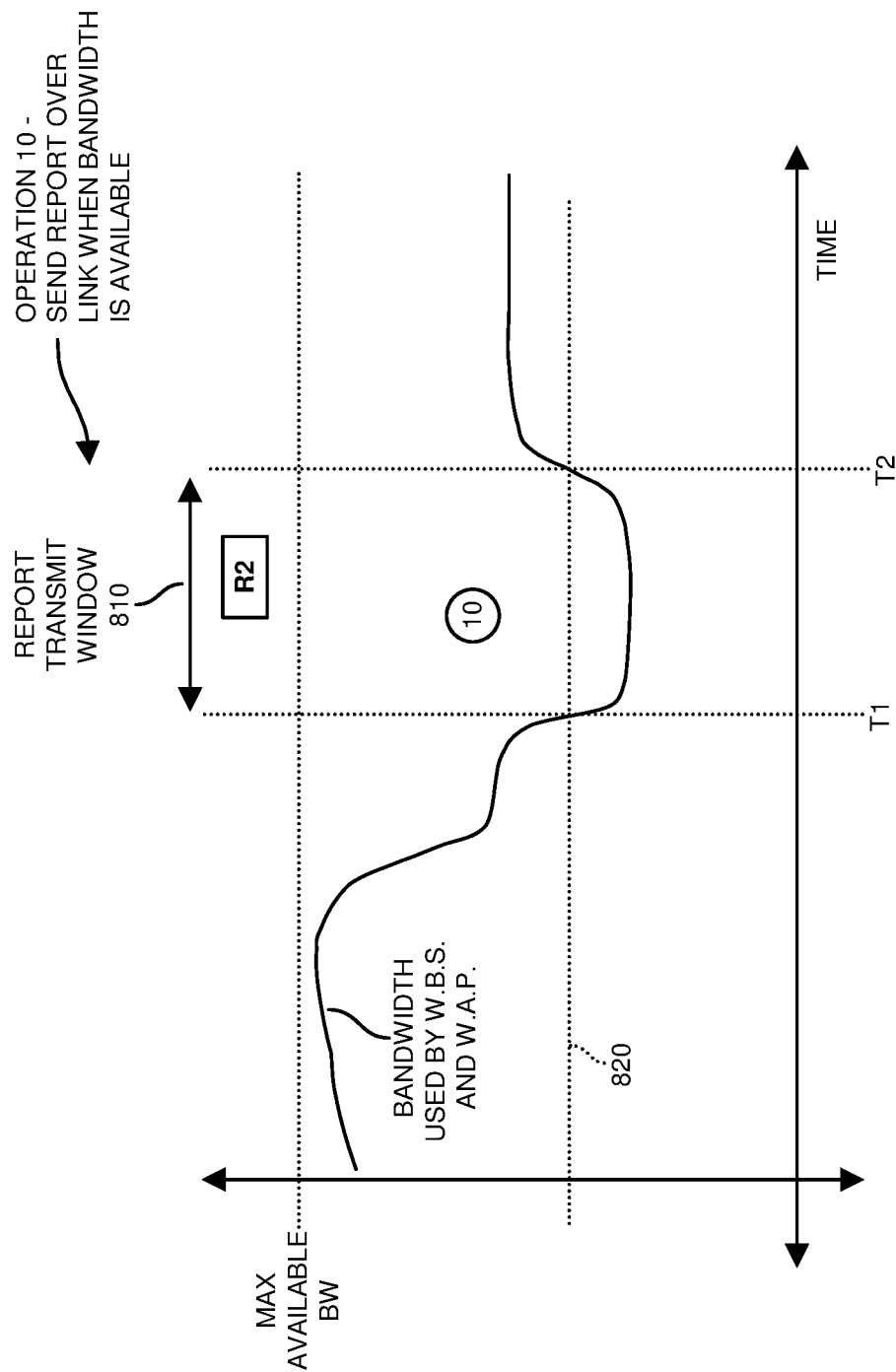
FIG. 8 is an example diagram illustrating monitoring of available bandwidth in a shared communication link and transmission of a report information during a window of time according to embodiments herein.

As further shown in FIG. 8, embodiments herein can include communicating the report R2-C (i.e., R2) or any other report indicating a failure/performance degradation to the gateway communication resource 162 and/or communication management resource 142 depending on availability of bandwidth in the shared communication link 189 and/or communication path 181, or communication path 182, which depends on usage by the wireless base station 121 and wireless access point 122.

FIG. 8 is an example diagram illustrating monitoring of available bandwidth in a shared communication link and transmission of a report information during a window of time according to embodiments herein.

In one embodiment, the gateway communication resource 141 and/or communication management resource 141 monitors conveyance of communications over the shared communication link 189 (or communication link 181, communication link 182, etc.) prior to forwarding the report R2 and/or log information L2 to the communication management resource 142 via bandwidth BW1 or bandwidth BW2 over the communication link 181.

More specifically, in operation #10, the communication management resource 141 (or other suitable entity such as gateway communication resource 161) monitors the shared communication link 189 (and potentially communication link 181, communication link 182, etc.) for available bandwidth. In one embodiment, communication of the log information L2 at an improper time would result in congestion and poor link quality for each of the wireless stations including wireless base station 121 and wireless access point 122 in subscriber domain.

To prevent undesirable congestion, the communication management resource 141 and/or gateway communication resource 161 monitors conveyance of communications over the shared communication link 189 between the gateway communication resource 161 and the gateway communication resource 162. In response to detecting available bandwidth in the shared communication link 189 such as detecting that the amount of communications over the shared communication link 181 (and/or communication link 181, 182) is below a threshold value 820, the gateway communication resource 161 or communication management resource 141 communicates the corresponding performance report R2 and/or log information L2 through the gateway communication resource 141 over the shared communication link 189 to the gateway communication resource 162 (and communication management resource 142) between time T1 and time T2. Thus, communication of the report R2 and/or log information L2 does not interfere with communications associated with wireless base station 121, wireless access point 122, and/or connectivity of devices 101, 102, etc., with the remote network 190.

Note that as an alternative to communicating the whole report R2 and/or whole set of log information L2 to the communication management resource 142 in response to the communication manager resource 141 and/or gateway communication resource 161 detecting a respective failure, embodiments herein further include sending alarms (alerts) from the communication management resource 141 and/or gateway communication resource 161 to the communication management resource 142 associated gateway communication resource 162 as individual messages if bandwidth is not available in the shared communication link 189 to transmit large amount of log information and/or report.

As an example, in one embodiment, in response to detecting a failure associated with the gateway communication resource 161 indicating that the CPU load of 95 percent is greater than the maximum threshold value of 80 percent, the communication management resource 141 and/or gateway communication resource 161 sends an individual alarm notification of CPU Load failure over the shared communication link 189 to the communication management resource 142 indicating such a failure condition.

As another example, in response to the communication manager resource 141 and/or gateway communication resource 161 detecting a respective failure associated with the downlink quality of service, average bandwidth, round-trip packet time, etc., embodiments herein further include sending respective alarms (alerts) from the communication management resource 141 and/or gateway communication resource 161 to the communication management resource 142 associated gateway communication resource 162 as individual messages if bandwidth is not available in the shared communication link 189 to transmit a large amount of log information and/or report.

For other parameters such as where there is no failure (i.e., those that receive a PASS status) such as buffer load, operating power, upland quality service, etc., there is no need to communicate such information to the gateway communication resource 162 and communication management resource 142.

Figure 9:
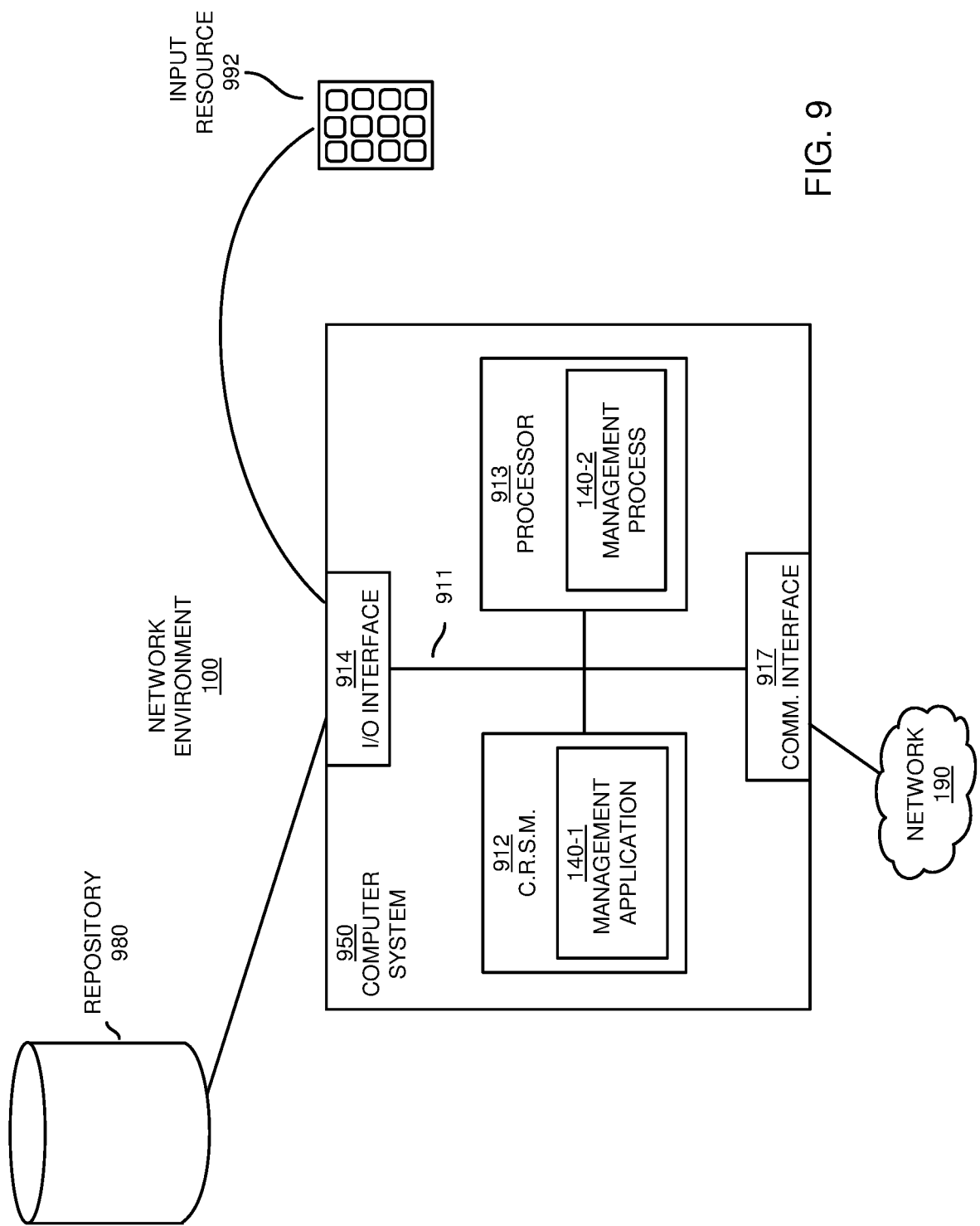
FIG. 9 is an example diagram illustrating example computer architecture operable to execute one or more operations according to embodiments herein.

FIG. 9 is an example block diagram of a computer system for implementing any of the operations as previously discussed according to embodiments herein.

Any of the resources (such as mobile communication devices, wireless access points, wireless stations, wireless base stations, communication management resource, bandwidth management resource, etc.) as discussed herein can be configured to include computer processor hardware and/or corresponding executable instructions to carry out the different operations as discussed herein.

As shown, computer system 950 of the present example includes an interconnect 911 that coupling computer readable storage media 912 such as a non-transitory type of media (which can be any suitable type of hardware storage medium in which digital information can be stored and retrieved), a processor 913 (computer processor hardware), I/O interface 914, and a communications interface 917.

I/O interface(s) 914 supports connectivity to repository 980 and input resource 992.

Computer readable storage medium 912 can be any hardware storage device such as memory, optical storage, hard drive, floppy disk, etc. In one embodiment, the computer readable storage medium 912 stores instructions and/or data.

As shown, computer readable storage media 912 can be encoded with management application 140-1 (e.g., including instructions) to carry out any of the operations as discussed herein.

During operation of one embodiment, processor 913 accesses computer readable storage media 912 via the use of interconnect 911 in order to launch, run, execute, interpret or otherwise perform the instructions in management application 140-1 stored on computer readable storage medium 912. Execution of the management application 140-1 produces management process 140-2 to carry out any of the operations and/or processes as discussed herein.

Those skilled in the art will understand that the computer system 950 can include other processes and/or software and hardware components, such as an operating system that controls allocation and use of hardware resources to execute management application 140-1.

In accordance with different embodiments, note that computer system may reside in any of various types of devices, including, but not limited to, a mobile computer, a personal computer system, wireless station, connection management resource, a wireless device, a wireless access point, a base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 850 may reside at any location or can be included in any suitable resource in any network environment to implement functionality as discussed herein.

Functionality supported by the different resources will now be discussed via flowcharts in FIG. 10. Note that the steps in the flowcharts below can be executed in any suitable order.

Figure 10:
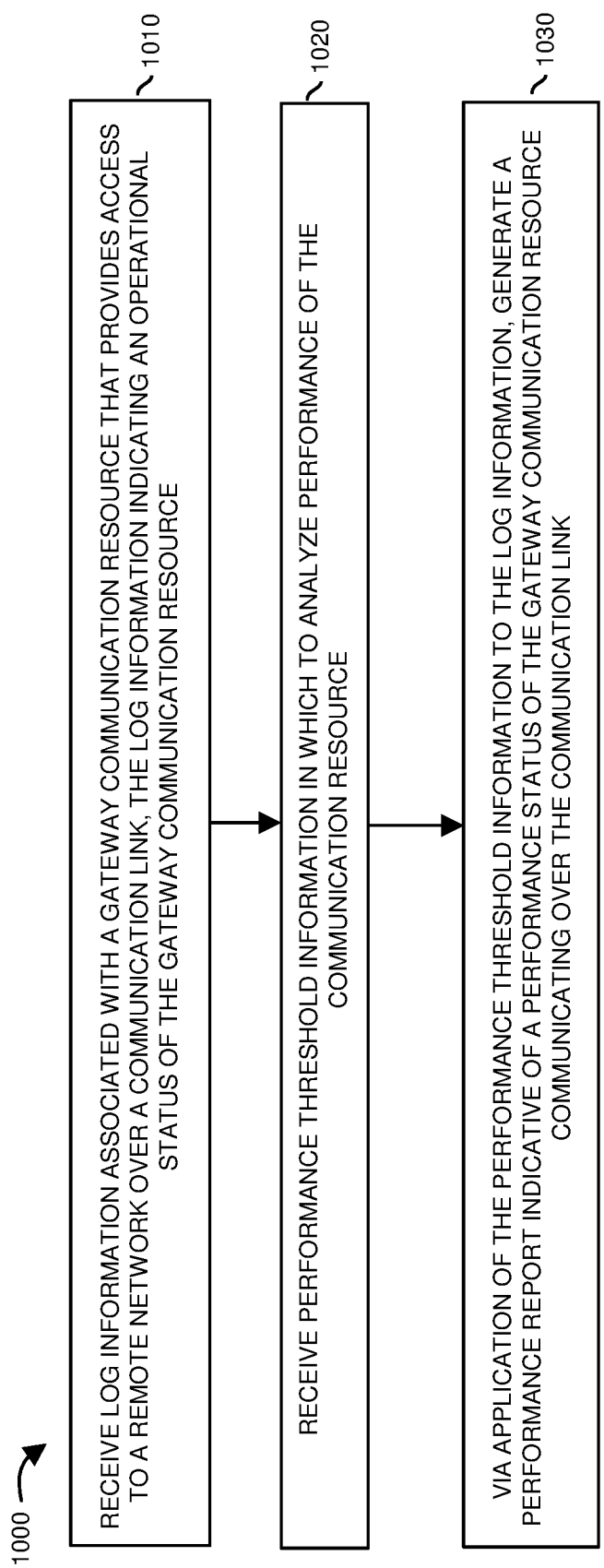
FIG. 10 is an example diagram illustrating a method according to embodiments herein.

FIG. 10 is a flowchart 1000 illustrating an example method according to embodiments. Note that there will be some overlap with respect to concepts as discussed above.

In processing operation 1010, the communication management resource 141 receives log information (such as L1, L2, etc.) associated with a gateway communication resource 161 that provides access to a remote network 190 over a shared communication link 189. The log information indicates an operational status of the gateway communication resource 161, shared communication link 189, gateway communication resource 162, etc.

In processing operation 1020, the communication management resource 141 receives performance threshold information 195 in which to analyze performance of the communication resource 161.

In processing operation 1030, via application of the performance threshold information 195 to the log information, the communication management resource 141 generates a performance report 195 indicative of a performance status of the gateway communication resource 161 communicating over the communication link 189.

Note again that techniques herein are well suited to facilitate improved communication resource monitoring and, if needed, alert notification. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method comprising:
    receiving log information associated with a gateway communication resource that provides access to a remote network over a communication link, the log information indicating an operational status of the gateway communication resource;
    receiving performance threshold information in which to analyze performance of the gateway communication resource; and
    via application of the performance threshold information to the log information, generating a performance report indicative of a performance status of the gateway communication resource communicating over the communication link;

monitoring conveyance of communications over the communication link between the gateway communication resource and the remote network; and in response to detecting that the amount of communications over the communication link is below a threshold value, communicating the performance report through the gateway communication resource over the communication link to a communication management resource in the remote network.

2. The method as in claim 1 further comprising:
communicating the performance report through the gateway communication resource to a remote communication device, the gateway communication resource being one of multiple gateway communication resources monitored by the remote communication device.

3. The method as in claim 2, wherein the performance threshold information specifies a performance threshold value; and
communicating the performance report in response to detecting that the performance status of the gateway communication resource falls below the performance threshold value, the report indicating that the performance status of the gateway communication resource falls below the performance threshold value.

4. The method as in claim 3, wherein the remote communication device is a cable modem termination system.

5. The method as in claim 1, wherein the gateway communication resource is a cable modem operative to provide a wireless base station connectivity through the communication link and a cable modem termination system to the remote network.

6. The method as in claim 5, wherein the communication link extends between the gateway communication resource and the cable modem termination system.

7. The method as in claim 1, wherein the gateway communication resource is a cable modem; and
wherein the communication management resource is a cable modem termination system.

8. The method as in claim 1, wherein the communication link supports conveyance of communications in accordance with a DOCSIS (Data Over Cable Service Interface Specification) communication protocol.

9. The method as in claim 1 further comprising:
via the gateway communication resource, providing network connectivity between a CBRS (Citizens Band Radio Service) wireless station and the remote network.

10. A method comprising:
receiving log information associated with a gateway communication resource that provides access to a remote network over a communication link, the log information received from the gateway communication resource and indicating an operational status of the gateway communication resource;
receiving performance threshold information in which to analyze performance of the gateway communication resource;
via application of the performance threshold information to the log information, generating a performance report indicative of a performance status of the gateway communication resource communicating over the communication link; and
in response to detecting that the performance status of the gateway communication resource is above a performance threshold value, notifying the gateway communication resource to delete the log information.

11. A method comprising:
receiving log information associated with a gateway communication resource that provides access to a remote network over a communication link, the log information indicating an operational status of the gateway communication resource, the gateway communication resource in communication with a wireless station providing wireless connectivity to multiple mobile communication devices;
receiving performance threshold information in which to analyze performance of the gateway communication resource;
via application of the performance threshold information to the log information, generating a performance report indicative of a performance status of the gateway communication resource communicating over the communication link; and
applying the performance threshold information to the log information as a background task to providing the wireless connectivity to the multiple mobile communication devices.

12. A system comprising:
a communication management resource operative to:
receive log information associated with a gateway communication resource that provides access to a remote network over a communication link, the log information indicating an operational status of the gateway communication resource;
receive performance threshold information in which to analyze performance of the gateway communication resource;
via application of the performance threshold information to the log information, generate a performance report indicative of a performance status of the gateway communication resource communicating over the communication link; and
communicate the performance report in response to detecting that the performance status of the gateway communication resource falls below the performance threshold value, the report indicating that the performance status of the gateway communication resource falls below the performance threshold value.

13. The system as in claim 12, wherein the communication management resource is operative to:
communicate the performance report to a remote communication device, the gateway communication resource being one of multiple gateway communication resources monitored by the remote communication device.

14. The system as in claim 13, wherein the performance threshold information specifies a performance threshold value; and
wherein the communication management resource is further operative to: communicate the performance report in response to detecting that the performance status of the gateway communication resource falls below the performance threshold value, the report indicating that the performance status of the gateway communication resource falls below the performance threshold value.

15. The system as in claim 14, wherein the remote communication device is a cable modem termination system.

16. The system as in claim 12, wherein the gateway communication resource is a cable modem operative to provide a wireless base station connectivity through the communication link and a cable modem termination system to the remote network.

17. The system as in claim 16, wherein the communication link extends between the gateway communication resource and the cable modem termination system.

18. The system as in claim 12, wherein the gateway communication resource is operative to:
   monitor conveyance of communications over the communication link between the gateway communication resource and the remote network; and
   in response to detecting that the amount of communications over the communication link is below a threshold value, communicate the performance report over the communication link to a communication management resource in the remote network.

19. The system as in claim 12, wherein the gateway communication resource is a cable modem; and
   wherein the communication management resource is a cable modem termination system.

20. The system as in claim 12, wherein the communication management resource is operative to:
   receive the log information from the gateway communication resource;
   apply the performance threshold information to the log information; and
   in response to detecting that the performance status of the gateway communication resource is above a performance threshold value, notify the gateway communication resource to delete the log information.

21. The system as in claim 12, wherein the communication link supports conveyance of communications in accordance with a DOCSIS (Data Over Cable Service Interface Specification) communication protocol.

22. The system as in claim 12, wherein the communication management resource is further operative to:
   provide wireless connectivity to multiple mobile communication devices; and
   apply the performance threshold information to the log information as a background task to providing the wireless connectivity to the multiple mobile communication devices.

23. The system as in claim 12, wherein the gateway communication resource is further operative to:
   via the gateway communication resource, provide network connectivity between a CBRS (Citizens Band Radio Service) wireless station and the remote network.

24. Computer-readable storage hardware having instructions stored thereon, the instructions, when carried out by computer processor hardware, cause the computer processor hardware to:
   receive log information associated with a gateway communication resource that provides access to a remote network over a communication link, the log information indicating an operational status of the gateway communication resource;
   receive performance threshold information in which to analyze performance of the gateway communication resource;
   via application of the performance threshold information to the log information, generate a performance report indicative of a performance status of the gateway communication resource communicating over the communication link; and
   in response to detecting that an amount of communications over the communication link is below a threshold value, communicate the performance report over the communication link to a communication management resource in the remote network.

25. A method comprising:
   receiving a performance report indicative of a performance status of a gateway communication resource communicating over a communication link, the gateway communication resource in communication with a wireless station providing wireless connectivity to multiple mobile communication devices, the performance report generated from log information associated with the gateway communication resource providing the wireless station and multiple mobile communication devices access to a remote network over the communication link;
   monitoring conveyance of communications over the communication link between the gateway communication resource and the remote network; and
   in response to detecting that the amount of communications over the communication link is below a threshold value, communicating the performance report over the communication link to a communication management resource in the remote network.

26. The method as in claim 25 further comprising:
   communicating the performance report through the gateway communication resource, the gateway communication resource being one of multiple gateway communication resources monitored by a remote communication device.

27. The method as in claim 26, wherein the performance threshold information specifies a performance threshold level, the method further comprising:
   communicating the performance report in response to detecting that the performance status of the gateway communication resource falls below the performance threshold level, the report indicating that the performance status of the gateway communication resource falls below the performance threshold value.

28. The method as in claim 27, wherein the remote communication device is a cable modem termination system.

29. The method as in claim 25, wherein the gateway communication resource is a cable modem operative to communicate communications from a wireless base station over the communication link.

30. The method as in claim 25, wherein the communication link extends between the gateway communication resource and a cable modem termination system.

31. The method as in claim 25, wherein the gateway communication resource is a cable modem; and
   wherein the communication management resource is a cable modem termination system.

32. The method as in claim 25 further comprising:
   receiving the log information from the gateway communication resource;
   applying the performance threshold information to the log information; and
   in response to detecting that the performance status of the gateway communication resource is above a performance threshold value, notifying the gateway communication resource to delete the log information.

33. The method as in claim 25, wherein the communication link supports conveyance of communications in accordance with the DOCSIS (Data Over Cable Service Interface Specification) communication protocol.

34. The method as in claim 25 further comprising:
providing wireless connectivity to multiple mobile communication devices; and
applying the performance threshold information to the log information as a background task to providing the wireless connectivity to the multiple mobile communication devices.

35. The method as in claim 25 further comprising:
via the gateway communication resource, providing network connectivity between a CBRS (Citizens Band Radio Service) wireless station and the remote network.

\* \* \* \* \*